US012744205B2

(12) United States Patent
Goto et al.

(10) Patent No.: US 12,744,205 B2
(45) Date of Patent: Sep. 22, 2026

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: Panasonic Corporation, Kadoma (JP)

(72) Inventors: Natsumi Goto, Hyogo (JP); Takashi Ko, Osaka (JP); Shinya Suzuki, Hyogo (JP); Fumiharu Niina, Hyogo (JP); Sho Tsuruta, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 700 days.

(21) Appl. No.: 17/640,249

(22) PCT Filed: Aug. 28, 2020

(86) PCT No.: PCT/JP2020/032532
§ 371 (c)(1),
(2) Date: Mar. 3, 2022

(87) PCT Pub. No.: WO2021/049318
PCT Pub. Date: Mar. 18, 2021

(65) Prior Publication Data
US 2022/0320490 A1 Oct. 6, 2022

(30) Foreign Application Priority Data
Sep. 9, 2019 (JP) ................................ 2019-163571

(51) Int. Cl.

| | |
|---|---|
| ***H01M 4/36*** | (2006.01) |
| ***H01M 4/131*** | (2010.01) |
| ***H01M 4/525*** | (2010.01) |
| ***H01M 4/62*** | (2006.01) |
| ***H01M 10/0525*** | (2010.01) |
| *H01M 4/02* | (2006.01) |
| *H01M 4/505* | (2010.01) |

(52) U.S. Cl.
CPC .......... *H01M 4/366* (2013.01); *H01M 4/131* (2013.01); *H01M 4/364* (2013.01); *H01M 4/525* (2013.01); *H01M 4/62* (2013.01); *H01M 10/0525* (2013.01); *H01M 2004/021* (2013.01); *H01M 2004/028* (2013.01); *H01M 4/505* (2013.01)

(58) Field of Classification Search
CPC ...... H01M 4/525; H01M 4/131; H01M 4/364; H01M 2004/021; H01M 2004/028; H01M 4/505; H01M 4/62; H01M 10/0525; H01M 4/366; C01G 53/82; C01G 53/50; C01P 2004/51; C01P 2004/53; C01P 2004/61
See application file for complete search history.

(56) References Cited

U.S. PATENT DOCUMENTS

| | | | | |
|---|---|---|---|---|
| 11,522,188 B2 * | 12/2022 | Ko | H01M 4/525 |
| 11,695,115 B2 * | 7/2023 | Goto | H01M 4/525 429/223 |
| 2016/0172663 A1 * | 6/2016 | Saka | H01M 4/366 429/223 |
| 2016/0301079 A1 | 10/2016 | Kokubu et al. | |
| 2018/0026268 A1 * | 1/2018 | Kim | H01M 4/525 429/223 |
| 2018/0226678 A1 | 8/2018 | Haruna et al. | |
| 2018/0261835 A1 | 9/2018 | Ogata et al. | |
| 2019/0074513 A1 * | 3/2019 | Ham | H01M 4/525 |
| 2019/0190018 A1 | 6/2019 | Aoki et al. | |

FOREIGN PATENT DOCUMENTS

| | | | |
|---|---|---|---|
| EP | 3734720 A1 | | 11/2020 |
| JP | 2010-40382 A | | 2/2010 |
| JP | 2017-33839 A | | 2/2017 |
| JP | 2018-73481 A | | 5/2018 |
| KR | 10-2017-0009557 A | | 1/2017 |
| KR | 10-2019-0058367 | * | 5/2019 |
| WO | 2015/079664 A1 | | 6/2015 |
| WO | 2017/098679 A1 | | 6/2017 |
| WO | 2018/043190 A1 | | 3/2018 |
| WO | WO 2019/039566 | * | 2/2019 |
| WO | 2019/132332 A1 | | 7/2019 |

OTHER PUBLICATIONS

International Search Report dated Oct. 20, 2020, issued in counterpart International Application No. PCT/JP2020/032532, w/English Translation. (5 pages).
The Extended European Search Report issued on Oct. 10, 2022, issued in counterpart EP Application No. 20862903.0. (7 pages).

* cited by examiner

*Primary Examiner* — Laura Weiner
(74) *Attorney, Agent, or Firm* — WHDA, LLP

(57) ABSTRACT

This positive electrode active material for a nonaqueous electrolyte secondary battery includes a lithium transition metal composite oxide that contains at least 80 mol % of Ni with respect to the total number of moles of metal elements excluding Li. B is present at least on the surfaces of the particles of the composite oxide. When particles having a particle diameter larger than a volume-based particle diameter of 70% (D70) are defined as first particles and particles having a particle diameter smaller than a volume-based particle diameter of 30% (D30) are defined as second particles, the molar fraction of B with respect to the total number of moles of metal elements excluding Li in the second particles is higher than the molar fraction of B with respect to the total number of moles of metal elements excluding Li in the first particles.

3 Claims, 1 Drawing Sheet

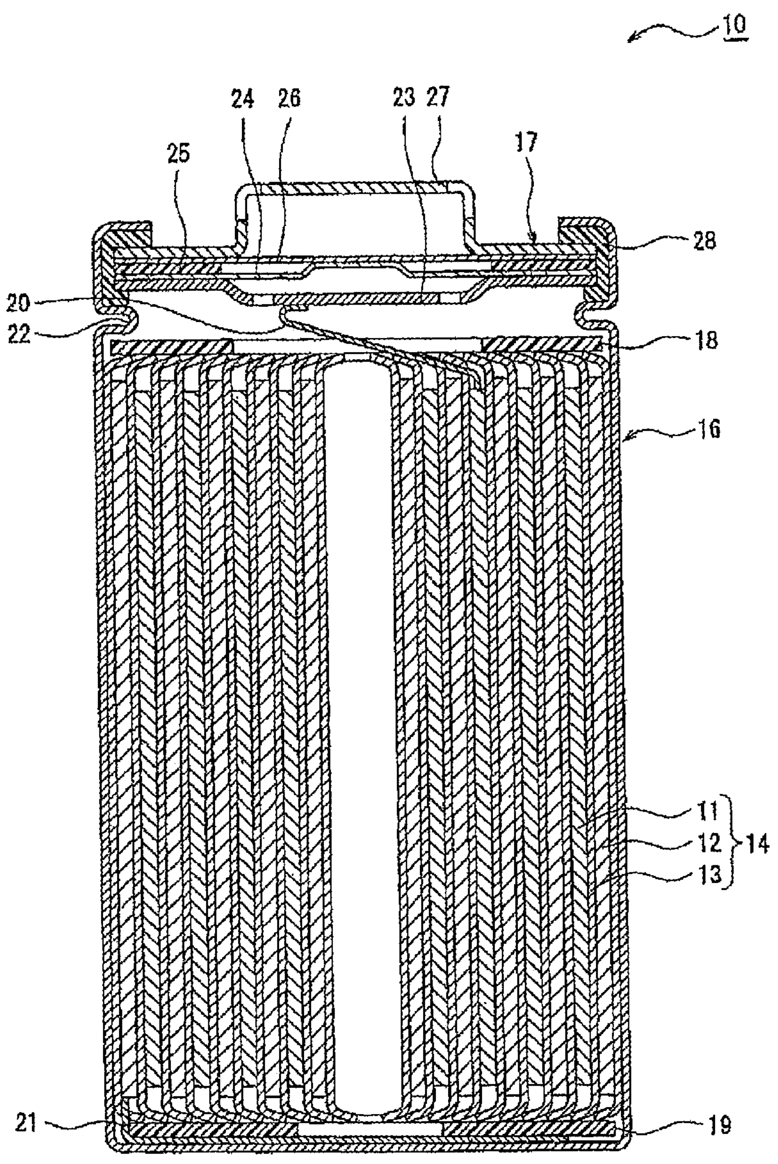
10
24
26
23
27
25
17
28
20
22
18
16
11
12
13
14
21
19

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

CROSS-REFERENCE TO RELATED APPLICATIONS

This application is a national stage of International Application No. PCT/JP2020/032532, filed Aug. 28, 2020, which claims priority to Japanese Patent Application No. 2019-163571 filed Sep. 9, 2019 both of which are hereby incorporated by reference in their entirety.

TECHNICAL FIELD

The present disclosure generally relates to a positive electrode active material for a non-aqueous electrolyte secondary battery and to a non-aqueous electrolyte secondary battery using the positive electrode active material.

BACKGROUND ART

In recent years, a lithium-transition metal composite oxide with a high Ni content has attracted attention as a positive electrode active material with a high energy density. Patent Literature 1, for example, discloses a method of adhering a boric acid compound onto a particle surface of a lithium-transition metal composite oxide for inhibiting a gas generation due to decomposition of an electrolyte on the surface of the positive electrode active material in a charged state.

CITATION LIST

Patent Literature

PATENT LITERATURE 1: JP 2010-40382 A

SUMMARY

However, with the presence of B in a state of the boric acid compound and the like on a particle surface of a lithium-transition metal composite oxide in a non-aqueous electrolyte secondary battery such as a lithium-ion battery, decomposition of the electrolyte is inhibited to improve a heat resistance of the battery, but a resistance value of the battery increases to decrease rate characteristics. The art disclosed in Patent Literature 1 still has a room for improvement in achievement of both improving the heat resistance of the battery and inhibiting the decrease in rate characteristics.

An object of the present disclosure is to achieve both improving the heat resistance of the battery and inhibiting the decrease in rate characteristics in a non-aqueous electrolyte secondary battery including a positive electrode active material with a high energy density.

A positive electrode active material for a non-aqueous electrolyte secondary battery of an aspect of the present disclosure is a positive electrode active material including: a lithium-transition metal composite oxide containing 80 mol % or more of Ni based on a total number of moles of metal elements excluding Li; and B being present on at least a particle surface of the metal composite oxide. When particles having a particle diameter on a volumetric basis larger than a 70% particle diameter (D70) are defined as first particles, and particles having a particle diameter on a volumetric basis smaller than a 30% particle diameter (D30) are defined as second particles, a mole fraction of B based on a total number of moles of metal elements excluding Li in the second particles is larger than a mole fraction of B based on a total number of moles of metal elements excluding Li in the first particles.

A non-aqueous electrolyte secondary battery of an aspect of the present disclosure comprises: a positive electrode including the positive electrode active material; a negative electrode; and a non-aqueous electrolyte.

The positive electrode active material of an aspect of the present disclosure may provide a non-aqueous electrolyte secondary battery that achieves both improving the heat resistance and inhibiting the decrease in rate characteristics.

BRIEF DESCRIPTION OF DRAWING

FIG. 1 is a sectional view of a non-aqueous electrolyte secondary battery of an example of an embodiment.

DESCRIPTION OF EMBODIMENTS

The present inventors have made intensive investigation to solve the above problem, and as a result, have found that setting a mole fraction of B in the second particles having a smaller particle diameter to be larger than a mole fraction of B in the first particles having a larger particle diameter may improve the heat resistance of the battery and inhibit the decrease in rate characteristics. Here, the first particles and the second particles are secondary particles formed by gathering primary particles of a lithium-transition metal composite oxide. The lithium-transition metal composite oxide with a high Ni content having a high energy density, in which an average valence of Ni increases during charge, is likely to decompose an electrolyte due to a side reaction with an electrolyte liquid, which deteriorates the heat resistance of the battery. Although the side reaction may be inhibited by the presence of B in a state of the boric acid compound and the like on surfaces of the secondary particles of the lithium-transition metal composite oxide, as described in Patent Literature 1, there has been a problem of increase in battery resistance to result in decrease in rate characteristics. By adjusting mole fractions of B in the first particles having a larger particle diameter and in the second particles having a smaller particle diameter, setting the mole fraction of B in the second particles having a larger surface area per unit mass to be higher effectively inhibits the side reaction with the electrolyte, and setting the mole fraction of B in the first particles to be lower reduces the mole fraction of B present in an entirety of the lithium-transition metal composite oxide, resulting in successfully inhibiting the decrease in rate characteristic.

Hereinafter, an example of an embodiment of a positive electrode active material for the non-aqueous electrolyte secondary battery according to the present disclosure and the non-aqueous electrolyte secondary battery using the positive electrode active material will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly the positive electrode active material constituting the positive electrode 11, will be described in detail.

[Positive Electrode]

The positive electrode 11 has a positive electrode core body and a positive electrode mixture layer provided on a surface of the positive electrode core body. For the positive electrode core body, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core body except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core body, drying and subsequently compressing the applied film to form the positive electrode mixture layers on both the surfaces of the positive electrode core body.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode active material includes particles of a lithium-transition metal composite oxide containing 80 mol % or more of Ni based on a total number of moles of metal elements excluding Li. With the Ni content of 80 mol % or more, the battery with a high capacity may be obtained. In the lithium-transition metal composite oxide, B is present on at least the particle surface. Hereinafter, for convenience of description, the lithium-transition metal composite oxide is referred to as "composite oxide (Z)". The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) may contain a metal element other than Li, Ni, and B. Example of the metal element may include Co, Mn, Al, Zr, B, Mg, Fe, Cu, Zn, Sn, Na, K, Ba, Sr, Ca, W, Mo, Nb, Ti, and Si. A preferable example of the composite oxide (Z) is a composite oxide represented by the general formula $Li_aNi_bCo_cM1_dM2_eB_fO_g$, wherein $0.8 \leq a \leq 1.2$, $b \geq 0.80$, $c \leq 0.15$, $0.01 \leq d \leq 0.12$, $0 \leq e \leq 0.05$, $0.001 \leq f \leq 0.020$, $1 \leq g \leq 2$, $b+c+d+e+f=1$, M1 represents at least one or more elements selected from the group consisting of Mn and Al, and M2 represents at least one or more elements selected from the group consisting of Groups 4 to 6 elements. That is, a mole fraction of B based on the total number of moles of metal elements excluding Li is preferably 0.001 to 0.020, and more preferably 0.005 to 0.015. The mole fraction of the metal elements in an entirety of the particles of the composite oxide (Z) is measured by inductively coupled plasma (ICP) atomic emission spectroscopic analysis. M1 is preferably Mn from the viewpoint of the capacity and the heat resistance.

The composite oxide (Z) is, for example, a secondary particle formed by aggregation of primary particles. The particle diameter of the primary particles constituting the secondary particle is, for example, 0.05 μm to 1 μm. The particle diameter of the primary particles is measured as a diameter of a circumscribed circle in a particle image observed with a scanning electron microscope (SEM). B may be present on surfaces of the primary particles inside the secondary particles and on a particle boundary as well as on surfaces of the secondary particles of the composite oxide (Z). A part of B may also be present inside the primary particles to form a solid solution with another metal element contained in the composite oxide (Z).

The composite oxide (Z) is particles having a median diameter (D50) on a volumetric basis of, for example, 3 m to 30 m, preferably 5 m to 25 m, and particularly preferably 7 m to 15 m. The D50, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

In the composite oxide (Z), when particles having a particle diameter on a volumetric basis larger than a 70% particle diameter (D70) are defined as first particles, and particles having a particle diameter on a volumetric basis smaller than a 30% particle diameter (D30) are defined as second particles, a mole fraction of B in the second particles is larger than a mole fraction of B in the first particles. This relationship may achieve both improving the heat resistance of the battery and inhibiting the decrease in rate characteristics. B is included in both of the first particles and the second particles.

The D70 means a particle diameter at which a cumulative frequency is 70% from a smaller particle diameter side in a particle size distribution on a volumetric basis. Similarly, the D30 means a particle diameter at which the cumulative frequency is 30% from the smaller particle diameter side in the particle size distribution on a volumetric basis. For example, the D70 is 9 m to 19 μm, and the D30 is 3 m to 13 m. The mole fraction of the metal elements present on the particle surface of the composite oxide (Z) is measured by X-ray photoelectron spectroscopic analysis (XPS). With the spot diameter of the X-ray irradiation being 1 mmφ or larger, hundreds of particles of the composite oxide (Z) are included in the irradiation spot, and the mole fraction of B on the surface of the composite oxide (Z) may be averagely measured.

On surfaces of the first particles and on surfaces of the second particles, a mole fraction of B based on a total number of moles of metal elements excluding Li (hereinafter, which may be referred to as "surface covering rate of B") may be 50% to 98%. This range may inhibit the decrease in battery capacity, and may also improve the heat resistance of the battery. Here, the surface covering rate of B may be calculated from the mole fraction of B based on a total number of moles of metal elements excluding Li by measuring the number of moles of the metal elements excluding Li on the secondary particle surfaces with XPS.

On the surfaces of the first particles and second particles, B may be present in a state of a boron compound containing Li and B. For a B source, a boron compound such as boric acid ($H_3BO_3$), boron oxide ($B_2O_3$), and lithium borate ($LiBO_2$ or $Li_2B_4O_7$) is used. When used as the B source, boric acid or boron oxide may react with Li present on the particle surface or a separately added Li source during calcination to generate the boron compound containing Li and B.

The boron compound may be formed for coating an entirety of the surfaces of the secondary particles, or may be scatteringly present on the secondary particle surfaces. When the boron compound is of particles, a particle diameter thereof is typically smaller than the particle diameter of the primary particles constituting the composite oxide (Z). The boron compound particles may be observed with an SEM. The boron compound is preferably adhered in a wide range without uneven distribution on a part of the surfaces of the secondary particles constituting the composite oxide (Z).

Thicknesses of the boron compound on the surface of the first particles and on the surface of the second particles are not particularly limited, and may be, for example, 10 nm to 100 nm.

In the composite oxide (Z), B may be present inside the primary particles to form a solid solution with a transition metal element such as Ni, as described above. A mole fraction of B based on the metal element forming the solid solution may be determined on a cross section of the primary particles by energy dispersive X-ray spectroscopy (EDS). In the composite oxide (Z), a total number of moles of B in a state of the solid solution and B in a state of the boron compound present on the surface is preferably 0.001 to 0.020 based on a total number of moles of metal elements excluding Li.

The composite oxide (Z) may be produced by, for example, the following procedure.

(1) Into each of two composite compounds (X1) and (X2) having different D50s and containing no Li, Li sources such as lithium hydroxide are added, and the mixtures are calcined to synthesize lithium composite oxides (Y1) and (Y2) having different D50s. An example of the composite compounds is a composite oxide or hydroxide containing Ni, Co, and Mn. At this time, one lithium composite oxide may be classified to obtain lithium composite oxides having two average particle diameters. For the classification, conventionally known methods may be used. The obtained lithium composite oxides (Y1) and (Y2) may be washed with water. Washing with water reduces not only the amount of Li present on the surfaces of the lithium composite oxides (Y1) and (Y2) but also the amount of Li present inside Y1 and Y2, resulting in generation of a space inside the washed Y1 and Y2 with water.

(2) B sources are added into each of the composite oxides (Y1) and (Y2) to form composites of B on the particle surfaces, then the composite oxides are calcined to synthesize composite oxides (Z1) and (Z2). Then, the composite oxides (Z1) and (Z2) may be mixed to obtain the composite oxide (Z). An example of the B source is boric acid ($H_3BO_3$). For forming composites, a dry particle composing machine (for example, NOB-130, manufactured by HOSOKAWA MICRON CORPORATION) or the like is used. At this time, the Li source such as lithium hydroxide may be added in addition to the B source.

In the step (2), setting the amount of $H_3BO_3$ to be added to the composite oxide (Y2) to be larger than the amount of $H_3BO_3$ to be added to the composite oxide (Y1) allows the mole fraction of B in the composite oxide (Z2) to be larger than the mole fraction of B in the composite oxide (Z1).

A calcining temperature in the step (2) is, for example, 200° C. to 500° C. Adjusting the calcining temperature of the composite oxides (Y1) and (Y2) may adjust surface covering rates of B and the thicknesses of the boron compound on the composite oxide (Z1) and composite oxide (Z2). Calcining the Y1 and Y2 with the B source at a high temperature may synthesize the composite oxides (Z1) and (Z2) having lower surface covering rates of B on the particle surfaces. Calcining the Y1 and Y2 with the B source at a low temperature may synthesize the composite oxides (Z1) and (Z2) having higher surface covering rates of B on the particle surfaces. The high temperature is referred to, for example, 350° C. to 500° C., and the low temperature is referred to, for example, 200° C. to 325° C. A relationship between the calcining temperature and the covering rate may change depending on a composition and shape, calcining time, calcining atmosphere, and the like of the lithium-transition metal composite oxide.

[Negative Electrode]

The negative electrode 12 has a negative electrode core body and a negative electrode mixture layer provided on a surface of the negative electrode core body. For the negative electrode core body, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core body except for a portion to which the negative electrode lead 21 is connected. The negative electrode 12 may be produced by, for example, applying a negative electrode mixture slurry including the negative electrode active material, the binder, and the like on the surface of the negative electrode core body, drying and subsequently compressing the applied film to form the negative electrode mixture layers on both the surfaces of the negative electrode core body.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Positive Electrode Active Material]

A nickel-cobalt-manganese composite hydroxide having D50 of 12 m with a composition of $Ni_{0.85}Co_{0.08}Mn_{0.07}(OH)_2$ and a nickel-cobalt-manganese composite hydroxide having D50 of 8 m with a composition of $Ni_{0.85}Co_{0.08}Mn_{0.07}(OH)_2$, obtained by coprecipitation, were separately calcined at 500° C. to obtain a nickel-cobalt-manganese composite oxide having a larger average particle diameter (X1) and a nickel-cobalt-manganese composite oxide having a smaller average particle diameter (Y1).

Then, a lithium hydroxide and the nickel-cobalt-manganese composite oxide having a larger average particle diameter (X1) were mixed so that a molar ratio between Li and the total amount of Ni, Co, and Mn was 1.08:1. This mixture was calcined in an oxygen atmosphere at 700° C. for 8 hours, and then crushed to obtain a lithium composite oxide having a larger average particle diameter (X2). The obtained lithium composite oxide (X2) was not washed with water.

Thereafter, a lithium hydroxide and the nickel-cobalt-manganese composite oxide having a smaller average particle diameter (Y1) were mixed so that a molar ratio between Li and the total amount of Ni, Co, and Mn was 1.08:1. This mixture was calcined in an oxygen atmosphere at 700° C. for 8 hours, and then crushed to obtain a lithium composite oxide having a smaller average particle diameter (Y2). The obtained lithium composite oxide (Y2) was not washed with water.

Next, the lithium composite oxide having a larger average particle diameter (X2) and boric acid ($H_3BO_3$) were dry-mixed so that a molar ratio between the total amount of Ni, Co, and Mn, and B in $H_3BO_3$ was 1:0.005. This mixture was calcined in an atmosphere at 300° C. for 3 hours, and then crushed to obtain a lithium composite oxide in which B was present on the particle surface (X3).

Next, the lithium composite oxide having a smaller average particle diameter (Y2) and $H_3BO_3$ were dry-mixed so that a molar ratio between the total amount of Ni, Co, and Mn, and B in $H_3BO_3$ was 1:0.015. This mixture was calcined in an atmosphere at 300° C. for 3 hours, and then crushed to obtain a lithium composite oxide in which B was present on the particle surface (Y3).

Thereafter, the lithium composite oxides (X3) and (Y3) were mixed at a mass ratio of 1:1 to be a positive electrode active material. B present on the particle surface and inside the particle may be quantified by ICP. The presence of B in a state of the boron compound containing Li and B on the particle surface may be confirmed by XRD, XPS, XAFS, and the like.

ICP analysis demonstrated that the positive electrode active material had a composition of $Li_{1.01}Ni_{0.84}Co_{0.08}Mn_{0.07}B_{0.01}O_2$. Thus, ICP demonstrated that the mole fraction of B based on the total number of moles of metal elements excluding Li (Ni, Co, Mn, and B) was 1.0%. ICP analysis also demonstrated that the mole fractions of B based on the total number of moles of metal elements excluding Li (Ni, Co, Mn, and B) in the lithium composite oxides (X3) and (Y3) were 0.5% and 1.5%, respectively.

A surface covering rate of B was calculated from the mole fraction of B based on a total number of moles of Ni, Co, and Mn by measuring the numbers of moles of Ni, Co, Mn, and B on the secondary particle surfaces with XPS. The surface covering rates of B of the lithium composite oxides (X3) and (Y3) were both 96%. In a particle size distribution of the positive electrode active material, the D50 was 12 μm, the D70 was 14 μm, and the D30 was 10 μm.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core body made of aluminum foil, the applied film was dried, and then rolled using a roller and cut to a predetermined electrode size to obtain a positive electrode in which the positive electrode mixture layer was formed on both the surfaces of the positive electrode core body. An exposed part where a surface of the positive electrode core body was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core body made of copper foil, the applied film was dried, and then rolled using a roller and cut to a predetermined electrode size to obtain a negative electrode in which the negative electrode mixture layer was formed on both the surfaces of the negative electrode core body. An exposed part where a surface of the negative electrode core body was exposed was provided at a part of the negative electrode.

[Preparation of Non-Aqueous Electrolyte]

Into a mixed solvent of ethylene carbonate (EC), ethyl methyl carbonate (EMC), and dimethyl carbonate (DMC) at a volume ratio of 3:3:4, lithium hexafluorophosphate ($LiPF_6$) was dissolved at a concentration of 1.0 mol/litter. Vinylene carbonate (VC) was further dissolved into the above mixed solvent at a concentration of 2.0 mass % to prepare a non-aqueous electrolyte.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte was injected thereinto, and then an opening of the exterior housing body was sealed to obtain a non-aqueous electrolyte secondary battery having a designed capacity of 650 mAh.

Example 2

A non-aqueous electrolyte secondary battery was produced in the same manner as in Example 1 except that each of X2 and Y2 was washed with water.

Comparative Example 1

A non-aqueous electrolyte secondary battery was produced in the same manner as in Example 1 except that X2 and $H_3BO_3$ were mixed so that a molar ratio between the total amount of Ni, Co, and Mn, and B in $H_3BO_3$ was 1:0.010, and Y2 and $H_3BO_3$ were mixed so that a molar ratio between the total amount of Ni, Co, and Mn, and B in $H_3BO_3$ was 1:0.010.

Comparative Example 2

A non-aqueous electrolyte secondary battery was produced in the same manner as in Example 2 except that X2 and $H_3BO_3$ were mixed so that a molar ratio between the total amount of Ni, Co, and Mn, and B in $H_3BO_3$ was 1:0.010, and Y2 and $H_3BO_3$ were mixed so that a molar ratio between the total amount of Ni, Co, and Mn, and B in $H_3BO_3$ was 1:0.010.

On each of the batteries of Examples and Comparative Examples, rate characteristics and a thermal runaway temperature were evaluated. The evaluation results are shown in Table 1. Table 1 also shows the mole fractions of B based on the total number of moles of metal elements excluding Li and the surface covering rates of B in the first particles and second particles.

[Evaluation of Rate Characteristics]

Each of the batteries of Examples and Comparative Examples was charged at a constant current of 0.5 It until a battery voltage reached 4.2 V under a temperature environment of 25° C., and charged at a constant voltage of 4.2 V until a current value reached 0.02 It. Then, the battery was left for 15 minutes. Thereafter, the battery was discharged at a constant current of 0.05 It until the battery voltage reached 2.5 V to measure a discharge capacity C1 at 0.05 It. Next, the battery was charged at a constant voltage of 4.2 V until the current value reached 0.02 It, and then the battery was left for 15 minutes. Thereafter, the battery was discharged at a constant current of 2 It until the battery voltage reached 2.5

V to measure a discharge capacity C2 at 2 It. The rate characteristics were calculated with the following formula.

$$\text{Rate Characteristics (\%)} = C2/C1 \times 100$$

[ARC Test]

The produced battery was charged at a constant current of 0.3 It until a battery voltage reached 4.2 V under an environment of 25° C., and then charged at a constant voltage of 4.2 V until a current value reached 0.05 It to be a charged state. Then, the battery was heated to 130° C. in an ARC testing apparatus, and subsequently a battery temperature was observed with a thermocouple attached to a plain part of the battery to measure a self-heating rate (° C./min) of the battery under an adiabatic environment. A battery temperature at which the self-heating rate of the battery reached 10° C./min was defined as the thermal runaway temperature.

TABLE 1

| | First particles (D70 or larger) | | Second particles (D30 or smaller) | | | |
|---|---|---|---|---|---|---|
| | Mole fraction of B (%) | Surface covering rate of B (%) | Mole fraction of B (%) | Surface covering rate of B (%) | Rate charac-teristics (%) | Thermal runaway tempera-ture (° C.) |
| Example 1 | 0.5 | 96 | 1.5 | 96 | 85 | 169 |
| Example 2 | 0.5 | 96 | 1.5 | 96 | 79 | 170 |
| Comparative Example 1 | 1 | 95 | 1 | 96 | 53 | 153 |
| Comparative Example 2 | 1 | 95 | 1 | 96 | 49 | 154 |

As shown in Table 1, any of the batteries of Examples had higher rate characteristics and a higher thermal runaway temperature than the batteries of Comparative Examples. In other words, it is found that both improving the heat resistance and inhibiting the decrease in rate characteristics are achieved on the batteries of Examples. In Example 1, since no washing with water was performed in the synthesis of the positive electrode active material, a larger amount of Li remained on the surface of the lithium composite oxide to have a good ion conductivity, resulting in higher rate characteristics than Example 2.

REFERENCE SIGNS LIST

10 Secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket

The invention claimed is:

1. A positive electrode active material for a non-aqueous electrolyte secondary battery, the positive electrode active material including:

a lithium-transition metal composite oxide containing 80 mol % or more of Ni based on a total number of moles of metal elements excluding Li; and B being present on at least a particle surface of the lithium-transition metal composite oxide, wherein B is present in the state of a boron compound containing Li and B, the lithium-transition metal composite oxide comprises first particles and second particles, the first particles having a particle diameter on a volumetric basis larger than a 70% particle diameter (D70), and the second particles having a particle diameter on a volumetric basis smaller than a 30% particle diameter (D30), wherein the D70 is 9 μm to 19 μm, and the D30 is 3 μm to 13 μm, a mole fraction of B based on a total number of moles of metal elements excluding Li in the second particles is larger than a mole fraction of B based on a total number of moles of metal elements excluding Li in the first particles, and B is contained in a boron compound containing Li on surfaces of the first particles and second particles, a thickness of the boron compound on the surfaces of the first particles and the second particles is 10 nm to 100 nm.

2. The positive electrode active material for a non-aqueous electrolyte secondary battery according to claim 1, wherein the lithium-transition metal composite oxide is a composite oxide represented by the general formula $Li_aNi_bCo_cM1_dM2_eB_fO_g$, wherein $0.8 \leq a \leq 1.2$, $b \geq 0.80$, $0 \leq c \leq 0.15$, $0.01 \leq d \leq 0.12$, $0 \leq e \leq 0.05$, $0.001 \leq f \leq 0.020$, $1 \leq g \leq 2$, $b+c+d+e+f=1$, M1 represents at least one or more elements selected from the group consisting of Mn and Al, and M2 represents at least one or more elements selected from the group consisting of Groups 4 to 6 elements.

3. A non-aqueous electrolyte secondary battery, comprising:

a positive electrode including the positive electrode active material according to claim 1;

a negative electrode; and a non-aqueous electrolyte.

* * * * *